US007945657B1

(12) United States Patent
McDougall et al.

(10) Patent No.: US 7,945,657 B1
(45) Date of Patent: May 17, 2011

(54) SYSTEM AND METHOD FOR EMULATING INPUT/OUTPUT PERFORMANCE OF AN APPLICATION

(75) Inventors: Richard J. McDougall, Menlo Park, CA (US); Spencer Shepler, Austin, TX (US); Brian L. Wong, Gordonsville, VA (US)

(73) Assignee: Oracle America, Inc., Redwood Shores, CA (US)

( * ) Notice: Subject to any disclaimer, the term of this patent is extended or adjusted under 35 U.S.C. 154(b) by 1210 days.

(21) Appl. No.: 11/093,998

(22) Filed: Mar. 30, 2005

(51) Int. Cl.
G06F 15/167 (2006.01)
G06F 15/173 (2006.01)
G06F 15/16 (2006.01)
G06F 13/10 (2006.01)
G06F 9/44 (2006.01)
G06F 13/12 (2006.01)
G06F 9/45 (2006.01)
G06F 13/00 (2006.01)
G06F 9/26 (2006.01)
G06F 9/46 (2006.01)
G06F 3/00 (2006.01)

(52) U.S. Cl. ........ 709/224; 709/212; 709/223; 709/230; 703/21; 703/22; 711/170; 711/210; 717/120; 717/124; 719/331

(58) Field of Classification Search .................. None
See application file for complete search history.

(56) References Cited

U.S. PATENT DOCUMENTS

| | | | |
|---|---|---|---|
| 5,303,166 A * | 4/1994 | Amalfitano et al. | 702/186 |
| 5,627,829 A * | 5/1997 | Gleeson et al. | 370/230 |
| 5,890,014 A * | 3/1999 | Long | 710/8 |
| 6,480,845 B1 * | 11/2002 | Egolf et al. | 1/1 |
| 6,631,354 B1 * | 10/2003 | Leymann et al. | 705/8 |
| 6,832,379 B1 * | 12/2004 | Zeryck et al. | 719/327 |
| 6,990,437 B1 * | 1/2006 | Abu El Ata | 703/2 |
| 7,006,963 B1 * | 2/2006 | Maurer | 703/21 |
| 2001/0043724 A1 * | 11/2001 | Hines | 382/114 |
| 2002/0174268 A1 * | 11/2002 | Goward et al. | 709/331 |
| 2004/0068730 A1 * | 4/2004 | Miller et al. | 718/106 |
| 2004/0088605 A1 * | 5/2004 | Nakamoto et al. | 714/43 |
| 2004/0199328 A1 * | 10/2004 | Croker | 702/1 |
| 2004/0225719 A1 * | 11/2004 | Kisley et al. | 709/212 |
| 2005/0097551 A1 * | 5/2005 | Samra | 718/1 |
| 2005/0114595 A1 * | 5/2005 | Karr et al. | 711/114 |
| 2005/0132078 A1 * | 6/2005 | Kumar et al. | 709/230 |
| 2006/0085665 A1 * | 4/2006 | Knight et al. | 714/2 |

OTHER PUBLICATIONS

Chu, Linkun et al, Depedency isolation for thred-based multi-tier Internet services, Mar. 13-17, 2005, IEEE, vol. 2, On pp. 796-806 vol. 2.* Vincent Danjean et al, Controlling Kernel Scheduling from User Space: An Approach to Enhancing Aplicatns' Reacticity to I/O Events, 2003, p. 490-499.*

* cited by examiner

*Primary Examiner* — Moustafa M Meky
*Assistant Examiner* — Ho Shiu
(74) *Attorney, Agent, or Firm* — Park, Vaughn, Fleming & Dowler LLP

(57) ABSTRACT

A system and method for emulating the input/output performance of an application. A workload description language is used to produce a small but accurate model of the application, which is flexible enough to emulate the application's performance with varying underlying system configurations or operating parameters. The model describes I/O operations performed by the application, and reflects any dependencies that exist between different application threads or processes. The model is then executed or interpreted with a particular system configuration, and various parameters of the I/O operations may be set at the model's run-time. During execution, the input/output operations described in the model are generated according to the specified parameters, and are performed. The system configuration and/or I/O operation parameters may be altered and the model may be re-run.

19 Claims, 6 Drawing Sheets

```
define file name=logfile, path=$dir, size=1g, reuse, prealloc, paralloc
define file name=datafile, path=$dir, size=$filesize, reuse, prealloc, paralloc
define process name=dbwr, instances=$ndbwriters
{
   thread name=dbwr, memsize=$memperthread, useism
   {
        flowop aiowrite name=dbaiowrite, filename=datafile, iosize=$iosize,
           workingset=10g, random, dsync, directio, iters=10
        flowop hog name=dbwr-hog, value=10000
        flowop semblock name=dbwr-block, value=100, highwater=10000
        flowop aiowait name=dbwr-aiowait
   }
} define process name=lgwr, instances=1
{
   thread name=lgwr, memsize=$memperthread, useism
   {
        flowop write name=lg-write, filename=logfile, iosize=256k,
           workingset=1g, random, dsync, directio
        flowop semblock name=lg-block, value=320, highwater=1000
   }
} define process name=shadow, instances=$nshadows
{
   thread name=shadow, memsize=$memperthread, useism
   {
        flowop read name=shadowread, filename=datafile, iosize=$iosize,
           workingset=10g, random, dsync, directio
        flowop hog name=shadowhog, value=$usermode
        flowop sempost name=shadow-post-lg, value=1, target=lg-block, blocking
        flowop sempost name=shadow-post-dbwr, value=1, target=dbwr-block, blocking
        flowop eventlimit name=random-rate
   }
}
```

FIG. 3

SYSTEM AND METHOD FOR EMULATING INPUT/OUTPUT PERFORMANCE OF AN APPLICATION

BACKGROUND

This invention relates to the field of computer systems. More particularly, a system and methods are provided for accurately modeling and emulating input/output performance of an application in different computing environments or with different operating parameters.

Various methods are traditionally employed to generate benchmarks for characterizing an application's likely performance in a particular environment. For example, an application's input/output (I/O) may be traced or modeled to predict the application's performance under different operating conditions, to determine capacity requirements, to determine how to increase its performance, and/or for other reasons.

Through tracing, an application's I/O activity is recorded to learn how it operates in a given computing environment (e.g., a particular file system operating with a given set of parameters). That trace, which may be very large, may reveal extensive system and operational characteristics of the application, but is generally tied to the specific system configuration on which the application was traced. The trace may allow accurate benchmarking of the application with that system configuration, but will produce inaccurate results if applied to different configurations or under different operating conditions or parameters (e.g., different file systems, different I/O parameters). In addition, the trace cannot capture I/O dependencies between application threads or processes.

A model-based method of testing or evaluating application performance involves the creation of a model representing the application's mix of input/output operations (e.g., 50% reads, 40% writes, 5% opens, 5% deletes). After the model is created, however, it is used to merely simulate the application's performance in a different environment. Instead of generating and evaluating actual input/output operations, those operations are simulated to produce statistical estimations of the application's performance. Thus, the resource consumption and latency of the application's I/O can only be estimated, and predictions of the application's performance in other environments will be suspect.

In summary, depending on the manner in which an application is characterized, the resulting predicted performance may or may not accurately represent the application's actual I/O behavior, and may or may not be flexible enough to reflect the application's performance in different computing environments.

For example, traditional methods of benchmarking cannot accurately represent a database application that has a strong dependence on a single thread or process (e.g., its transaction log writer). Tracing or simulated modeling might capture the different types of I/O operations, but cannot capture the effect that additional latency on that single thread will have on other threads.

Also, depending on the complexity of the application being benchmarked, measuring its input/output performance may require substantial expertise. For example, testing a file system for a DBMS (Database Management System) may require sufficient database administration skills to not only configure the computing environment for the DBMS, but also to apply a set of on-line transaction processing benchmarks, such as TPC-C (offered by Transaction Processing Performance Council).

A significant amount of setup time may thus be required to enable a single performance measurement. And, during testing, computer system resources must generally be dedicated to operation of the application and collection of performance data. To test different computing environment configurations or operating parameters requires additional time for reconfiguration.

Thus, a system and a method are needed for benchmarking an application's I/O performance so as to allow the application's performance under different operating environments or conditions to be accurately tested.

SUMMARY

In one embodiment of the invention, a system and methods are provided for emulating the input/output performance of an application. A workload description language is used to produce a small but accurate model of the application, which is flexible enough to emulate the application's performance with varying underlying system configurations or operating parameters. The model describes I/O operations performed by the application, and reflects any dependencies that exist between different application threads or processes.

The model is then executed or interpreted with a particular system configuration, and various parameters of the I/O operations may be set at the model's run-time. During execution, the input/output operations described in the model are generated according to the specified parameters, and are performed. The system configuration and/or I/O operation parameters may be altered and the model may be re-run.

Thus, performance measurements may be obtained by an operator who is not an expert in the application being benchmarked. The operator obtains a model or workload description for the application and uses it to execute the performance tests in the desired environment (e.g., a particular filesystem or operating system) or with the desired operating parameters or input/output attributes.

The model may be developed using data obtained during a trace of the application, and/or using information provided by the application's developers. Data from a trace may be statistically reduced to place it in a form that can be captured by the workload description language.

To validate the model, summary statistics obtained during an actual execution of the application may be compared to the same type of statistics gathered during execution of the model. If the statistics match (e.g., within a pre-determined degree of difference), the model may be considered accurate.

DESCRIPTION OF THE FIGURES

FIG. 3 is a simplified model or workload description of a database program, according to one embodiment of the present invention.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for benchmarking the I/O performance of an application through modeling and emulation. The application is modeled using a descriptive workload language and a trace or analysis of its workload. The model is then executed or interpreted to generate I/O activity within a particular computing environment, as if the application was really executing. In particular, input/output operations mirroring those of the application are actually performed, not just simulated.

In this embodiment, the application is modeled with a workload description language that is not only able to characterize or express all input/output operations of the application, but is also able to reflect inter-relationships between application threads or processes.

In particular, the language allows emulation of the application's I/O behavior and modeling of its performance within different layers of the I/O stack. The application's I/O behavior may be learned directly from application experts, or may be gleaned from application traces or other performance data. Because the model reflects the application's behavior (e.g., including I/O dependencies between application threads or processes), not just its input/output activity, it allows someone relatively unskilled with the application to simulate the application with a variety of file systems or other operating conditions, and to accurately measure performance under those conditions.

More specifically, the model can be applied or run in an environment (e.g., with one file system) in which various operating conditions or parameters may be altered. By altering different conditions for different runs, measurements of the application's predicted performance under those conditions can be modeled.

Figure 1:
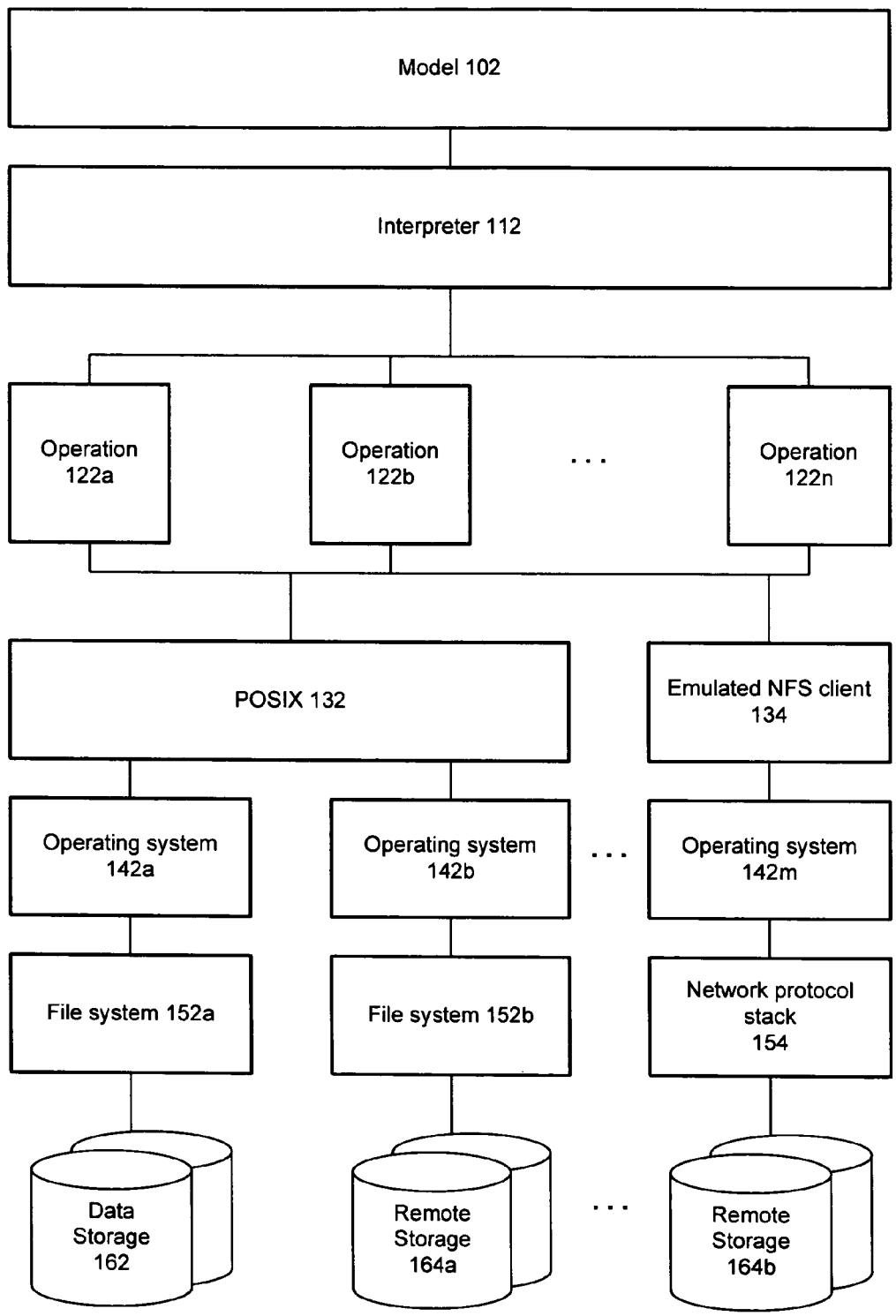
FIG. 1 is a block diagram depicting a computing environment in which an embodiment of the present invention may be implemented.

In one embodiment, the modeling and performance measuring environment may be configured in a manner similar to FIG. 1. The framework of FIG. 1 allows us to take a model or workload description, interpret it, and in real time generate actual reads, writes, opens, closes and/or other I/O operations, on top of a real operating system, a real file system and a real storage device.

Model (or workload description) 102 may be a model of virtually any type of application, such as an OLTP (Online Transaction Processing), DSS (Decision Support Software), ERP (Enterprise Resource Planning), web, mail or other application. Illustrative methods and a language for producing model 102 are described below.

Model 102 is interpreted or executed by interpreter 112, using specified parameters, such as what files to open or manipulate, how big the files should be, how many processes or threads to run, the order and flow of processing, how much memory to allocate, what storage devices or locations to use, etc. These parameters may be used to configure the environment in which the model is run, as well as the I/O operations that will be performed.

The interpreter generates I/O operations by invoking corresponding operation implementations 122. In particular, each input/output operation described in model 102 is thus emulated with an appropriate operation 122, with default parameters and/or parameters specified in the model or at the time the model is interpreted. For example, one operation (e.g., operation 122a) may comprise a read operation. Another operation (e.g., operation 122b) may comprise a write, and so on. The interpreter and operations may be written in C, Java or another suitable programming language.

The operations performed during benchmarking are dictated by model 102, but may be configured with different parameters (e.g., file size, working set size) during different runs, as specified in the invocation of the interpreter. Whereas the model comprises a description of the application's I/O operations, the interpreter generates those operations with default or specified parameters by invoking the required operations with those parameters.

In different embodiments of the invention, operations 122 may be performed on different storage devices using different access methods, protocols and operating systems. FIG. 1 provides an illustrative sampling of some possible implementations.

In one implementation, the operations are executed normally using POSIX access method 132 and a compatible operating system 142 (e.g., operating system 142a, 142b). Thus, interpreter 112 may apply the model with a first operating system (e.g., Solaris by Sun Microsystems, Inc.) some number of times, altering various operating parameters for different runs. Then the model may be interpreted or run with a different operating system (e.g., Linux) and the same or different operating parameters. In addition, a different file system access method (e.g., XML) may be applied during different benchmark runs.

In this implementation, file system 152a performs the requested input/output operations on the specified local files and storage devices. Different file systems may be employed in different benchmark runs, with each file system having its own implementations of the I/O operations. Illustrative file systems include UFS (Unix File System), NFS (Network File System), ZFS (Zetta File System), etc. File system 152a may be considered part of operating system 142 in one embodiment.

In another implementation, POSIX access method 132 is used with a compatible operating system 142 and file system 152b, but the storage device(s) 164a on which the data are stored are remote (e.g., accessed across a network).

In yet another implementation, operations 122 are performed on remote storage 164b, using an NFS client or emulated NFS client 134, along with a compatible operating system (e.g., operating system 142m) and network protocol stack 154 for accessing the remote storage.

To test the performance of different file systems or protocol stacks with a particular application, model 102 is interpreted by interpreter 112 using the same operating system (and access method), the same storage device(s) and the same operations with the same parameters. Because only the file system or protocol stack changes, an accurate comparison of the application's performance with the different file systems can be obtained.

And, as described below, parameters of operations 122 may be altered during the benchmarking process to determine how a particular file system or operation may be configured to make the application perform best (e.g., to provide the best throughput).

In addition to determining the best file system or file system configuration for a modeled application, different data storage devices may be used during the benchmarking. For example, the performance of storage servers from Sun Microsystems, Inc. and Network Appliance, Inc. may be compared using application model 102.

To help generate model 102, a trace of the application may be performed and analyzed to obtain a list of the application's I/O operations, the file(s) involved in those operations, timestamps of the operations, file size, I/O size, how many users were active, how many threads or processes executed, which operations were performed by which threads, other operational or system characteristics, etc. Some type of statistical reduction may be applied to reduce a voluminous application analysis into data that can be captured and reflected in the model.

In one embodiment of the invention, the workload description language used to produce an application model describes the application, or its workload, as a series of processes, threads and flows. Each process represents a separate address space containing one or more threads. Each thread represents a flow of execution of a closed queue of flow operations. Each flow operation is a pre-defined operation, such as a file read, a file write, a semaphore block, etc. Special flow operations may be used to represent idle time, user activity, limits on the number of times a particular operation is performed, etc.

Figure 2A:
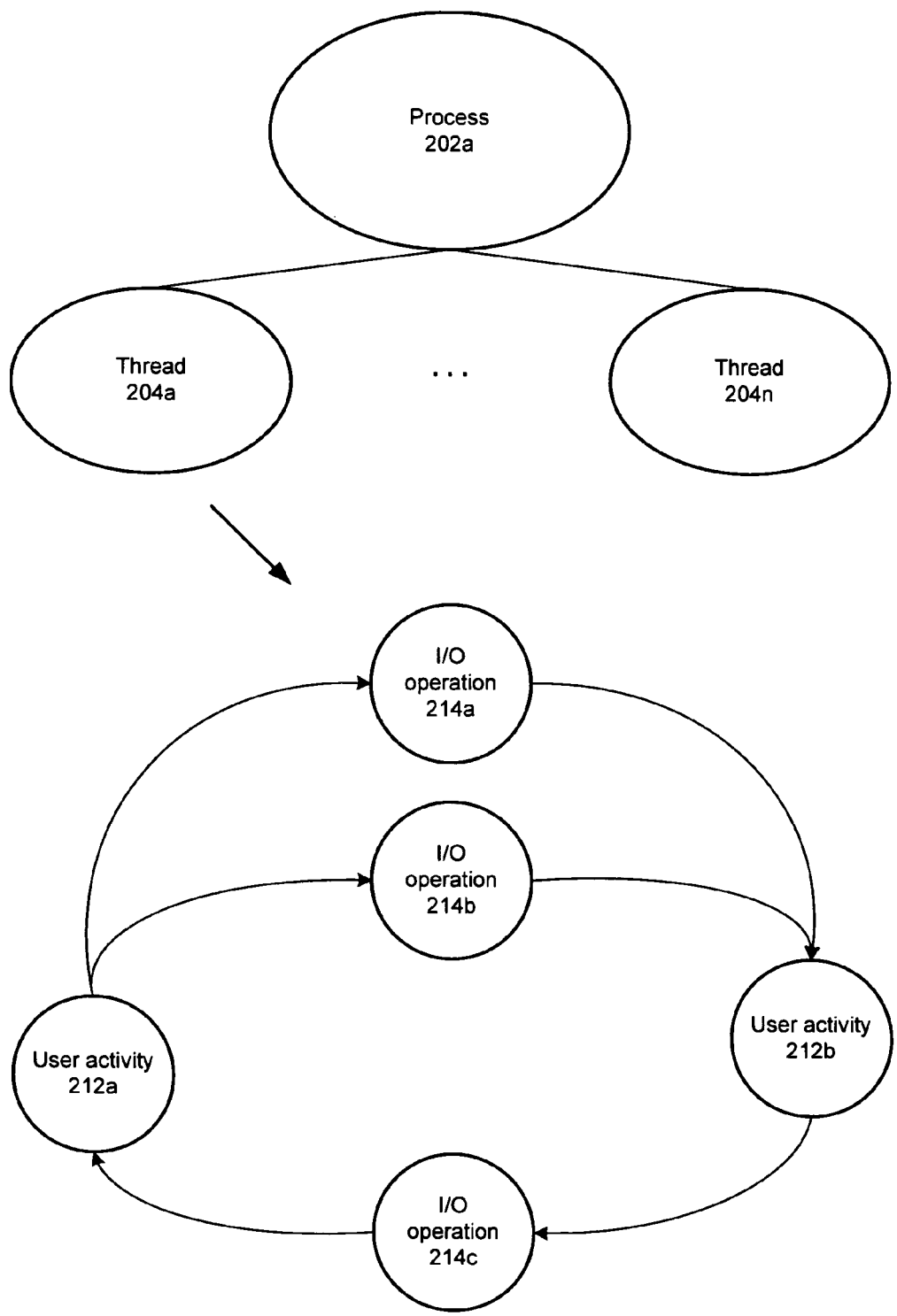
FIGS. 2A-B graphically depict relationships between processes, threads and flow operations of a model or workload description, according to one embodiment of the invention.
Figure 2B:
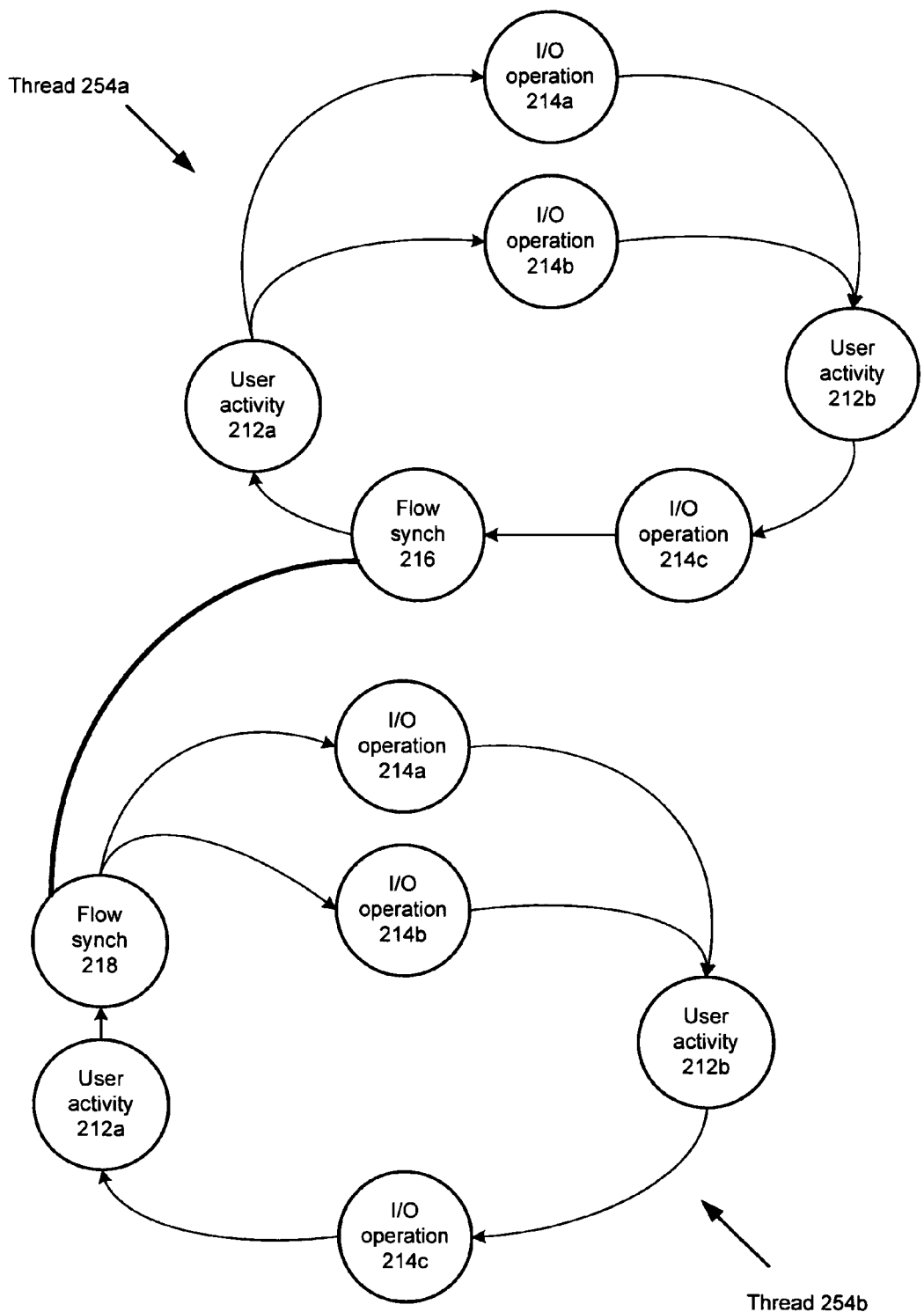

FIGS. 2A-2B graphically depict relations between processes, threads and flow operations according to one embodiment of the invention. In FIG. 2A, a first process 202a comprises multiple threads, 204a-204n. Thread 204a includes the illustrated flow operations: user activity 212a, 212b and I/O operations 214a, 214b and 214c. Thus, starting from user activity 212a, thread 204a performs I/O operations 214a and 214b, followed by user activity 212b and I/O operation 214c before returning to user activity 212a. The user activity flow operations may be identical or may comprise different activity. The input/output operations may comprise file opens, closes, deletes, reads writes, etc.

In one embodiment of the invention, "user activity" flow operations may involve random or default user-level activity that does not constitute application input/output. For example, various memory references may be executed to fill or change the contents of a CPU cache (e.g., L1, L2). These flow operations thus yield a more realistic representation of the environment in which the application is being benchmarked, by denying the application exclusive use of the cache. Without this operation, the input/output activity may experience better, but unrealistic, cache performance.

Using one illustrative workload description language, a random I/O workload could be modeled as follows:
define process randomizer
define thread random-thread procname=randomizer
{
    flowop read name=random-read, filename=bigfile, random, iosize=2 k
    flowop write name=random-write, filename=bigfile, random, iosize=2 k
}

In this example workload model, a single process named "randomizer" is defined, which comprises a single thread named "random-thread." The thread includes two flow operations, a file-level read and a file-level write. Each operation is to the same file (bigfile), is performed at random file offsets, and uses an I/O size of 2 KB.

TABLE 1 lists illustrative types of flow operations that may be used to describe the workload of an application in an embodiment of the invention. The Description column describes the effect of the flow operations. The illustrated flow operations are file-based (e.g., read from a file, create a file) unless otherwise indicated.

TABLE 1

| Type of flow operation | Description |
| --- | --- |
| read | Read |
| write | Write |
| create | Create the specified file |
| delete | Delete the specified file |
| append | Append to the specified file |
| aiowrite | Asynchronous write |
| aiowait | Wait on asynchronous write |
| getAttr | Get an attribute of a specified file |
| setattr | Set an attribute of the file |
| readdir | Read a directory |
| semblock | Block the thread until woken |
| sempost | Wake a specified thread |
| user | Perform user-level activity |
| eventlimit | Stop the thread after a specified number of iterations |
| repeat-until | Repeat a series of flow operations a specified number of times |
| skip-to | Skip to a specified flow operation (may be modified by a value indicating how often to perform the skip) |

TABLE 2 lists illustrative parameters and attributes of flow operations, threads and/or processes, according to one embodiment of the invention.

TABLE 2

| Parameter or Attribute | Description |
| --- | --- |
| name | Identify flow operation, thread or process |
| type | Identifies the type of flow operation |
| path | Absolute or relative directory path |
| filename | Name of file for a flow operation |
| instances | Number of instances of process to model |
| size | File size |
| memsize | Amount of memory to allocate a thread |
| iosize | Size of an I/O operation |
| workingset | Effective active portion of a file being accessed |
| highwater | Maximum number of outstanding events in a synchronization queue |
| value | For generic operations requiring a value parameter |
| random | Perform operation (e.g., file read, file write) at random offsets |
| reuse | Reuse a file rather than recreated it each time the model is interpreted |
| prealloc | Pre-allocate blocks of the specified file before attempting to read from or write to the file |
| paralloc | Allocate the specified file using multiple CPU threads, to speed allocation |
| useism | Use Solaris intimate shared memory |
| dsync | Wait for data writes to be acknowledged before continuing |
| directio | Perform direct I/O (i.e., bypass cache) |
| target | Name of a blocked flow operation to wake |
| iters | Number of times to perform the specified flow operation |

Variables may be employed to represent values for parameters or attributes that can be set at the time a model is interpreted or run. Thus, if the parameter "iosize=2 k" is replaced with "iosize=$iosize" in a model, the iosize parameter could be set at the time the interpreter (e.g., interpreter 112 of FIG. 1) is instructed to run the model.

Default values may be assigned to variable parameters for which values are not specified. Default values, or values used to override default values, may illustratively be taken from benchmarks for the application (e.g., from TPC or SPEC (Standard Performance Evaluation Corporation)).

As shown in FIG. 2B, to reflect or replicate inter-process or inter-thread constraints (e.g., input/output dependencies) that occur in an application, flow operation synchronization may be introduced into the application's model. For example, in a database application, a process may perform a number of read operations, then block on another process that performs writes. A workload description language employed within an embodiment of the invention will reflect this blocking.

FIG. 2B illustrates the use of blocking threads in a model. In this example thread 254*b* blocks, waiting for thread 254*a*. This is reflected in a dependency between flow operation 216 of thread 254*a* and flow operation 218 of thread 254*b*.

Using workload description language in one embodiment of the invention, a simple database application model consisting of three processes may be represented as:

```
define process logwr
define process dbwr instances=1
define process shadow instances=$shadows
define thread logwrite procname=logwr, memsize=10 m
{
    flowop write name=log-write, filename=log, iosize=1 m,
        workingset=1 m, random, dsync
    flowop semblock name=log-block, value=40
}
define thread dbwrite procname=dbwr, memsize=10 m
{
    flowop write name=db-write, filename=datafile, iosize=1
        m, workingset=1 m, random, dsync
    flowop semblock name=db-block, value=10, highwa-
        ter=1000
}
define thread shadow procname=shadow, memsize=10 m
{
    flowop read name=shadowread, filename=datafile
    flowop sempost name=shadow-post-log, value=1,
        target=log-block
    flowop sempost name=shadow-post-dbwr, value=1,
        target=db-block
}
```

Each process in this model includes a single thread and is allocated 10 MB of memory, and each thread has at least two flow operations. One instance of each of the logwr and dbwr processes will be instantiated, but multiple instances of the shadow process may be spawned. The flow operations have attributes such as working set size, random file offsets, the name of a data file, etc.

In this example, the flow operation "log-block" indicates that the "logwrite" thread is to block after performing the "log-write" flow operation. Similarly, the flow operation "db-block" causes the "dbwrite" thread to block after the "db-write" operation.

In the "shadow" thread, the flow operation "shadow-post-log" wakes the blocked logwrite thread, and the "shadow-post-dbwr" operation wakes the blocked dbwrite thread. The "value" attribute for the shadow-post-log and shadow-post-dbwr flow operations indicates the number of events to post each time they are performed.

The "value" attribute for the log-block and db-block operations indicates when they will be woken—in this example, after 40 or 10 events, respectively, are posted by the shadow-post-log and shadow-post-dbwr operations.

Although not shown in this example, a model may also include processes, threads or flow operations for creating files (e.g., database tables, log files), deleting files and any other file-level I/O the application normally performs.

For example, data files used in flow operations may be identified by a workload description language as follows, to specify a location, size and/or other attributes:
define file name=datafile, path=$dir, size=$filesize, prealloc, reuse, paralloc In this example the file "datafile" will be manipulated as specified by the model's flow operations, in a location ($dir) and with a size ($filesize) specified at invocation.

FIG. 3 is a model of an OLTP database program, according to one embodiment of the invention. In this embodiment, data used to generate the model's workload description language may be gathered from traces of actual operation of the application.

In particular, by analyzing the various types of I/O operations performed by the application in a production environment, processes, threads and flow operations can be defined and constraints between operations can be identified. The resulting model can then be executed or applied with different operating conditions (e.g., working set size, number of processes, memory allocation, file system, operating system) to measure and predict how the application would perform under those conditions.

When an interpreter (e.g., interpreter 112 of FIG. 1) is invoked for a model, it will configure and execute the operations described in the model, using the specified attributes to yield an accurate representation of how the application would perform. The workload description language thus distills application events into short descriptions, which can be repetitively performed by the interpreter without executing the entire application.

File system performance (e.g., latency, throughput, number of operations per second) can then be measured. Dynamic attributes of the model can then be adjusted, added or removed, and the model can be run again.

Figure 4:
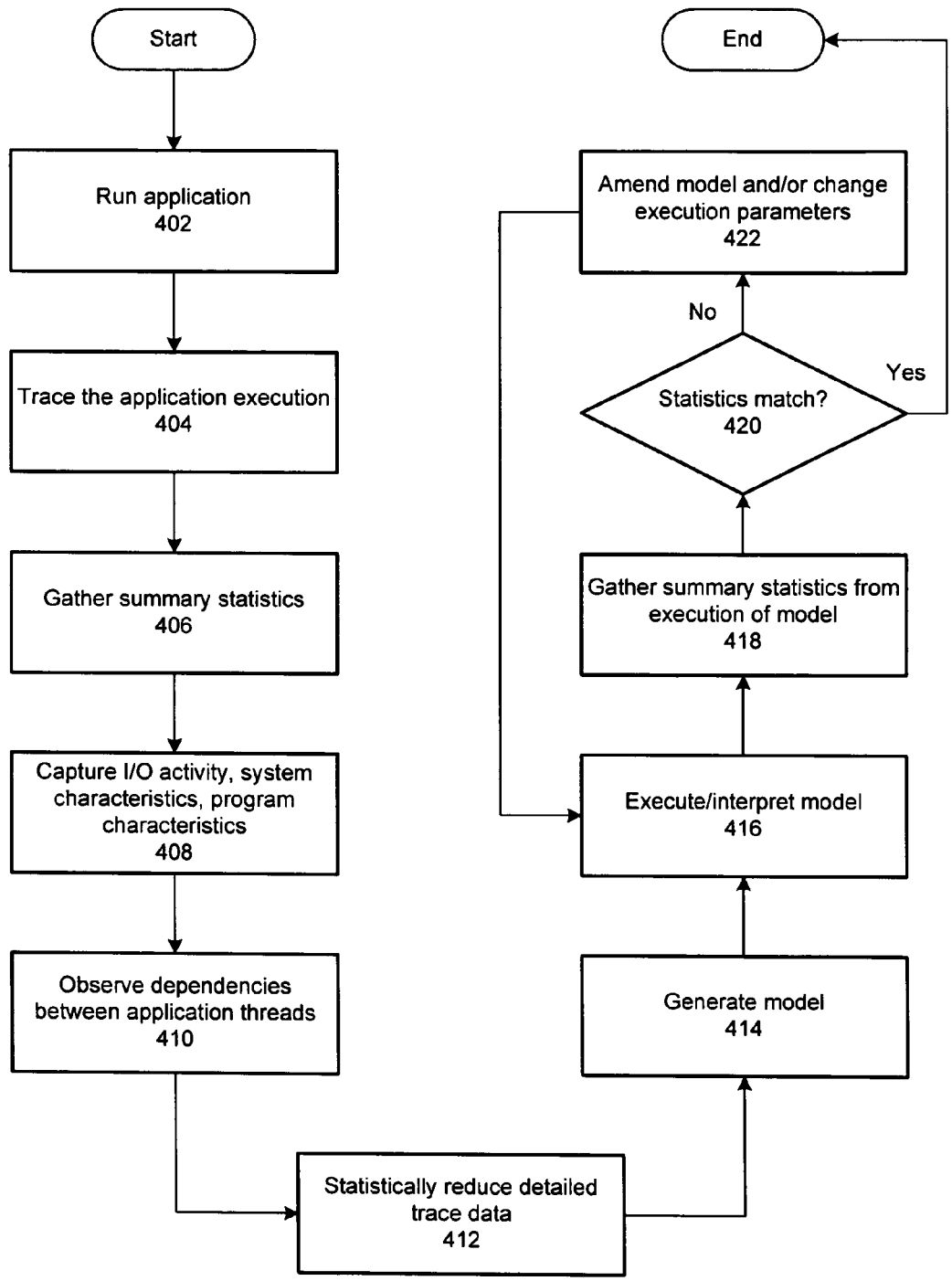
FIG. 4 is a flowchart demonstrating one method of creating a model or workload description, in accordance with an embodiment of the present invention.

FIG. 4 is a flowchart demonstrating a method of creating a model for use in the benchmarking or performance measuring of an application, according to one embodiment of the invention.

In operation 402, the application is executed in a given computing environment, for purposes of obtaining performance and operational characteristics of the application for use in developing the model.

In operation 404, the application is traced as it is executed. In particular, all or substantially all I/O activity is to be captured.

In operation 406, summary statistics may be recorded, such as throughput, latency, number of I/O operations per second, microseconds of CPU time per operation, etc. Statistics regarding the operating system may also be captured, such as load and the number of physical input/output operations. As described below, some or all of the summary statistics may be used to validate the model after its creation.

In operation 408, detailed data regarding the application's I/O activity is captured, along with other characteristics of the application and/or the environment in which the application was executed. Any of these data may be used to create the model, and may also be used to validate it.

Captured program characteristics may include various categories of information, such as static parameters and statistical representations (e.g., distributions, probabilities, means) regarding fileset characteristics, directory-level operations and file-level operations.

Static parameters may include total number of files in the workload set, the total number of I/O operations per second, total bandwidth (e.g., in MB/sec), etc.

Fileset characteristics may include: the number of directories, number of files in a directory, the depth of a directory tree, filename length, file size, the modification or access time of a file, etc.

Directory-level operations may be specified in operations/second, and may include (per file or file set) file access selection within a directory or file set or the number of: file creates, file deletes, directory creates, directory removes, directory reads, attribute gets, attribute updates, rename operations, link lookups, etc.

File-level input/output operations may be specified in operations/second and may include (per file or file set): number of reads, number of writes, size of a read, size of a write, the seek offset of an operation within a file, number and/or type of lock operations, I/O operation attributes (e.g., synchronous data write, synchronous data and meta-data write, direct (i.e., cache bypass) read or write), etc.

Captured system characteristics may include: what type of operating system the application was run on, what type of file system was used to access storage devices, the type and location of the storage devices, etc.

In operation 410, input/output dependencies between application processes and/or threads are observed. For example, the application trace may be analyzed to determine which threads were blocked by which other threads. In one embodiment of the invention, an operating system trace utility such as Solaris DTrace® may be used to trace the execution of each thread of an application, include application-level thread interactions. These thread traces may then be combined with I/O trace information to help construct the model.

In operation 412, the detailed (and likely voluminous) trace data are statistically reduced, into a form that can be represented by a descriptive workload language.

In operation 414, a model is created using a workload description language. The model captures all input/output operations performed by the application, along with applicable parameters and attributes such as which files were affected, the size of the I/O operations, applicable working set sizes, whether file accesses were to fixed or variable (e.g., random) offsets, etc.

The model also captures any I/O dependencies detected between parts of the application. Thus, one thread or flow operation of the model may block upon another thread or flow operation, as described above.

In operation 416, the model is executed or interpreted. In one embodiment, an interpreter program is invoked to interpret the model and to configure and initiate the input/output activity described by the model. The interpreter will also emulate any user activity or flow synchronization (e.g., blocking) reflected in the model.

In operation 418, summary statistics are gathered from execution of the model, for comparison with the summary statistics gathered from the application in operation 406.

In operation 420, the two sets of summary statistics are compared. If they match or are similar to within some degree of tolerance, the method ends. Otherwise, in operation 422 the model is amended and/or operating parameters or conditions of the computing environment are modified. Afterwards, the illustrated method returns to operation 416 to run the amended model.

Figure 5:
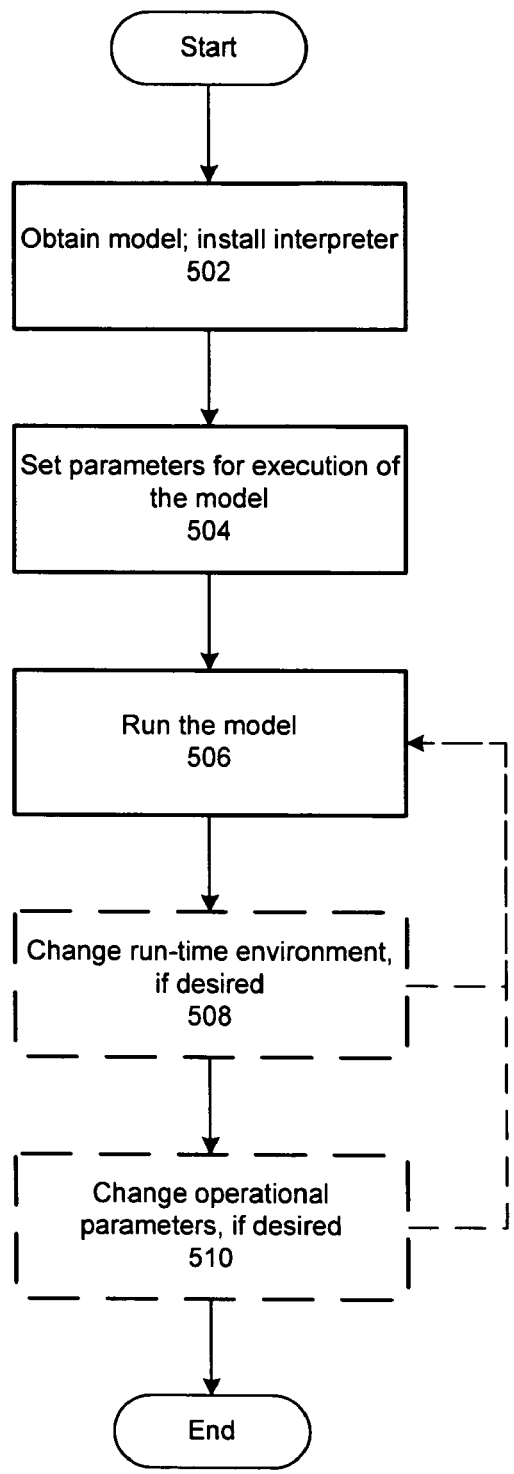
FIG. 5 is a flowchart illustrating one method of using a model or workload description, in accordance with an embodiment of the invention.

FIG. 5 demonstrates a method of using a model to perform benchmarking of an application, according to one embodiment of the invention. The model may have been created through a process such as that of FIG. 4.

In operation 502, a model or workload description of the application is obtained, and an interpreter (or other utility or program) for executing the model is installed.

In operation 504, I/O parameters may be set for execution of the model. As described above, various parameters or attributes of I/O operations performed by the application may be set at run-time. Illustratively, these parameters may be obtained from a third-party, as benchmarks representing the optimal manner in which to execute the application, or may be test values used to determine the best manner in which to configure the application's I/O activity for a particular computing environment.

In operation 506, the model is executed or interpreted, and data describing the input/output performance of the model is captured. After operation 506, the method may end, or characteristics of the environment or model may be altered for another execution.

In optional operation 508, the computing environment may be changed in anticipation of another execution of the model. For example, a different file system, operating system or access method may be adopted. Or, a different set of storage devices or other communication interfaces may be employed.

In optional operation 510, the I/O parameters set in operation 504 may be altered in anticipation of another execution of the model. For example, different file sizes or I/O operation sizes may be imposed. Or, a different number of processes or threads of the model may be instantiated.

After optional operations 508 and 510, the illustrated method may return to operation 506 to re-run the model with the new system configuration or operational parameters. In one implementation of the method of FIG. 5, input/output attributes of flow operations may be modified based on characteristics of the run-time environment. For example, when emulating a database application, transaction write logs of different sizes may be emulated, depending on the number of database write operations per second.

In one embodiment of the invention, two different performance benchmarking techniques or toolsets are employed to compare local or client filesystems with fileservers. For example, a tool used to measure the performance of a UFS disk-based file system typically issues POSIX level operating system calls to generate required input/output pattern. Meanwhile, a tool used to measure the performance of an NFS server may issue NFS packets remotely across a network. Both schemes attempt to emulate application I/O behavior.

In this embodiment of the invention, both types of I/O (POSIX and NFS packets) are generated from a single tool using a common workload description or model. This is made possible by the separation between the workload description and the access method.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only.

They are not intended to be exhaustive or to limit the invention to the forms disclosed. Accordingly, the scope of the invention is defined by the appended claims, not the preceding disclosure.

What is claimed is:

1. A computer-implemented method of emulating an input/output performance of an application, comprising:
obtaining a model of the application's workload, wherein said model describes the application's input/output behavior within different layers of an input/output stack, the input/output behavior comprising:
input/output operations performed by the application; and
input/output dependencies between application threads or processes, wherein an input/output dependency occurs when an input or output operation from one thread or process blocks an input or output operation from another thread or process;
setting one or more parameters for said input/output operations;
setting one or more parameters in the model for a computing environment
under which the model is executed or interpreted; and
interpreting said model to:
generate said input/output operations configured according to said parameters; and
perform said generated input/output operations.

2. The method of claim 1, wherein said dependency involves one of the two or more threads blocking on another of the two or more threads.

3. The method of claim 1, further comprising, prior to said obtaining.
executing the application;
tracing input/output performed by the application during the execution; and
creating said model to describe said traced input/output.

4. The method of claim 3, wherein said tracing comprises:
capturing all input/output operations performed by the application during said execution;
identifying characteristics of the application, said characteristics including at least one of the following:
number of application processes;
number of executing threads;
number of files manipulated;
types of input/output operations performed; and
quantity of each type of input/output operation performed.

5. The method of claim 3, wherein said creating comprises:
identifying types of input/output operations performed during said execution; and
for each type of input/output operation, statistically reducing the identified input/output operations of said type into a probability distribution.

6. The method of claim 3, further comprising:
during said executing of the application, capturing summary statistics describing the traced input/output; and
after said interpreting:
capturing emulation statistics describing said performed input/output operations; and
comparing said summary statistics with said emulation statistics.

7. The method of claim 1, further comprising:
changing one or more of said parameters; and
re-interpreting said model to generate said input/output operations having the changed parameters.

8. The method of claim 1, further comprising:
changing a filesystem on which said input/output operations are performed.

9. The method of claim 1, further comprising:
changing an operating system on which said input/output operations are performed.

10. The method of claim 1, further comprising:
changing an access method by which said input/output operations are performed.

11. The method of claim 1, wherein said model comprises:
one or more model processes, each said model process having one or more process parameters and comprising a set of model threads;
wherein each said model thread has one or more thread parameters and comprises a series of flow operations, wherein each of the flow operations is a predefined operation; and
wherein each said flow operation has one or more operation parameters and describes one of said input/output operations.

12. The method of claim 1, wherein the one or more parameters for the computing environment comprise at least one of:
a file system,
an operating system,
a storage device, or
one or more communication interfaces.

13. A non-transitory computer readable medium storing instructions that, when executed by a computer, cause the computer to perform a method of emulating an input/output performance of an application, comprising:
obtaining a model of the application's workload, wherein said model describes the application's input/output behavior within different layers of an input/output stack, the input/output behavior comprising:
input/output operations performed by the application; and
input/output dependencies between application threads or processes, wherein an input/output dependency occurs when an input or output operation from one thread or process blocks an input or output operation from another thread or process;
setting one or more parameters for the input/output operations;
setting one or more parameters in the model for a computing environment under which the model is executed or interpreted; and
interpreting said model to:
generate said input/output operations configured according to said parameters; and
perform said generated input/output operations.

14. The computer-readable medium of claim 13, wherein the one or more parameters for the computing environment comprise at least one of:
a file system,
an operating system,
a storage device, or
one or more communication interfaces.

15. A computer system for modeling an application's input/output, comprising:
a processor;
a model describing the application's input/output behavior within different layers of the input/output stack, the input/output behavior comprising:
input/output operations performed by the application, and
input/output dependencies between application threads or processes, wherein an input/output dependency occurs when an input or output operation from one thread or process blocks an input or output operation from another thread or process;

a set of input/output operation parameters;

a set of computing environment parameters under which the model is executed or interpreted;

wherein the processor is configured as an interpreter that generates the input/output operations configured according to the set of parameters; and a file system configured to perform said input/output operations on a set of files described by the mode.

16. The computer system of claim 15, wherein:

said interpreter generates the input/output operations in a manner reflecting said dependencies.

17. The computer system of claim 15, further comprising:

a set of operation files, wherein said interpreter invokes one of the operation files for each type of input/output operation generated.

18. The computer system of claim 15, further comprising:

a collection of storage devices storing the set of files.

19. The computer system of claim 15, wherein the one or more parameters for the computing environment comprise at least one of:

a file system, an operating system, a storage device, or one or more communication interfaces.

* * * * *